(12) United States Patent
Santos (10) Patent No.: US 11,095,141 B1
(45) Date of Patent: Aug. 17, 2021

(54) BATTERY CHARGE CONTROLLER AND RELATED SYSTEMS AND METHODS

(71) Applicant: Glow Energy Group Corp., Orlando, FL (US)

(72) Inventor: Victor Santos, Orlando, FL (US)

(73) Assignee: Glow Energy Group Corp., Orlando, FL (US)

( * ) Notice: Subject to any disclaimer, the term of this patent is extended or adjusted under 35 U.S.C. 154(b) by 282 days.

(21) Appl. No.: 16/262,341

(22) Filed: Jan. 30, 2019

(51) Int. Cl.
*H02J 7/00* (2006.01)
*H02J 7/35* (2006.01)

(52) U.S. Cl.
CPC ............ *H02J 7/007* (2013.01); *H02J 7/0021* (2013.01); *H02J 7/35* (2013.01)

(58) Field of Classification Search
CPC .. H02J 7/007; H02J 7/0021; H02J 1/10; H02J 1/106
USPC ............................. 320/101, 126, 138; 700/82
See application file for complete search history.

(56) References Cited

U.S. PATENT DOCUMENTS

| | | | | |
|---|---|---|---|---|
| 5,563,493 A | * | 10/1996 | Matsuda | G06F 1/263 320/124 |
| 9,800,085 B2 | * | 10/2017 | Kim | H02J 7/35 |
| 10,616,970 B2 | * | 4/2020 | Johnson | H05B 45/3725 |
| 2005/0083014 A1 | * | 4/2005 | Baumgartner | H02J 7/00041 320/116 |
| 2011/0181233 A1 | * | 7/2011 | Mino | B60L 53/51 320/101 |
| 2012/0047386 A1 | * | 2/2012 | Matsui | H02J 3/387 713/340 |

* cited by examiner

*Primary Examiner* — Richard V Muralidar
(74) *Attorney, Agent, or Firm* — Allen, Dyer, Doppelt & Gilchrist, P.A.

(57) ABSTRACT

A battery charge controller is configured to optimize battery charging from a power source, particularly a renewable power source like a photovoltaic panel. The battery charge controller includes a processing unit that intelligently switches between battery banks being charged to maximize electrical power applied to charging and help maintain even battery bank voltages. The battery charge control can also include a starting circuit allowing electrical power to be applied directly to the processing unit from the power source when the battery bank banks are too depleted to power on the processing unit to commence battery charging.

20 Claims, 11 Drawing Sheets

BATTERY CHARGE CONTROLLER AND RELATED SYSTEMS AND METHODS

FIELD OF THE INVENTION

The present invention relates to battery charging, and more particularly, to controlling battery charging from renewable energy sources to optimize charging.

BACKGROUND OF THE INVENTION

Due to the often intermittent nature of renewable energy sources like solar- and wind-power, systems utilizing such energy sources will almost always include one or more batteries to ensure a steady and predictable supply of electrical power is available when needed. The feasibility of using a given renewable energy source to power a given system is, correspondingly, often not simply a function of the availability of the energy source, but the also the capacity of the batteries, as well as the ability of the batteries to quickly charge when excess power is available.

While improvements are being made with respect to increasing the energy yield from renewable sources, as well as in the storage capacity of batteries, a key factor remains the effectiveness with which available power is applied to charge the batteries. To help improve this factor, various charge controllers have been developed. Nonetheless, further improvements are possible.

For instance, the battery charge controller, itself, requires electrical power to operate. In a situation where the batteries become completely depleted, it will ordinarily not be possible to start the battery charge controller and recharge the batteries, even where power from the renewable energy source is once again available. In such situations, it will be necessary to replace the batteries or use another charging device to at least partially recharge the batteries. Where the renewable energy power system is mounted to a mobile platform (e.g., a golf cart) moved to a remote location or a system otherwise located in a distant area, the loss of battery charging functionality is likely to result in serious inconvenience.

SUMMARY OF THE INVENTION

In view of the foregoing, it is an object of the present invention to provide an improved battery charge controller and related systems and methods.

According to an embodiment of the present invention, a charge controller includes, a plurality of charging connections, at least one voltage input connection, a charging circuit, a voltage regulator and a processing unit. The plurality of charging connections are for connecting a respective plurality of battery banks, and the at least one voltage input connection is for connecting a power source. The charging circuit is electrically connected between the plurality of charging connections and the at least one voltage input connection and operable to independently charge the respective plurality of battery banks at the plurality of charging connections with electrical power from the at least one voltage input connection, and to sense an input voltage at the input voltage connection and respective battery bank voltages at each of the plurality of charging connections. The voltage regulator is electrically connected to the charging circuit and operable to output regulated electrical power. The processing unit is electrically connected to the voltage regulator to receive the regulated electrical power and in signal communication with the charging circuit, the processing unit including at least one microprocessor and machine readable memory configured to control the charging circuit based on the input voltage and respective battery bank voltages sensed thereby.

According to an aspect of the present invention, the charge controller further includes a starting circuit connected between the at least one voltage input connection and the processing unit, the starting circuit including a normally open switch, the normally open switch being operable by a user to supply the electrical power from the at least one voltage input connection to the processing unit so as to bypass the charging circuit and the voltage regulator. The starting circuit allows the processing unit to be powered on when the respective battery bank voltages are insufficient to energize the starting circuit via the charging circuit and voltage regulator.

According to another aspect of the present invention, the processing unit is further configured with program instructions to execute a selection routine to direct the charging circuit to automatically change which of the respective plurality of battery banks are being charged after a predetermined checkpoint interval.

These and other objects, aspects and advantages of the present invention will be better appreciated in view of the drawings and following detailed description of preferred embodiments.

DETAILED DESCRIPTION OF PREFERRED EMBODIMENTS

Figure 1:
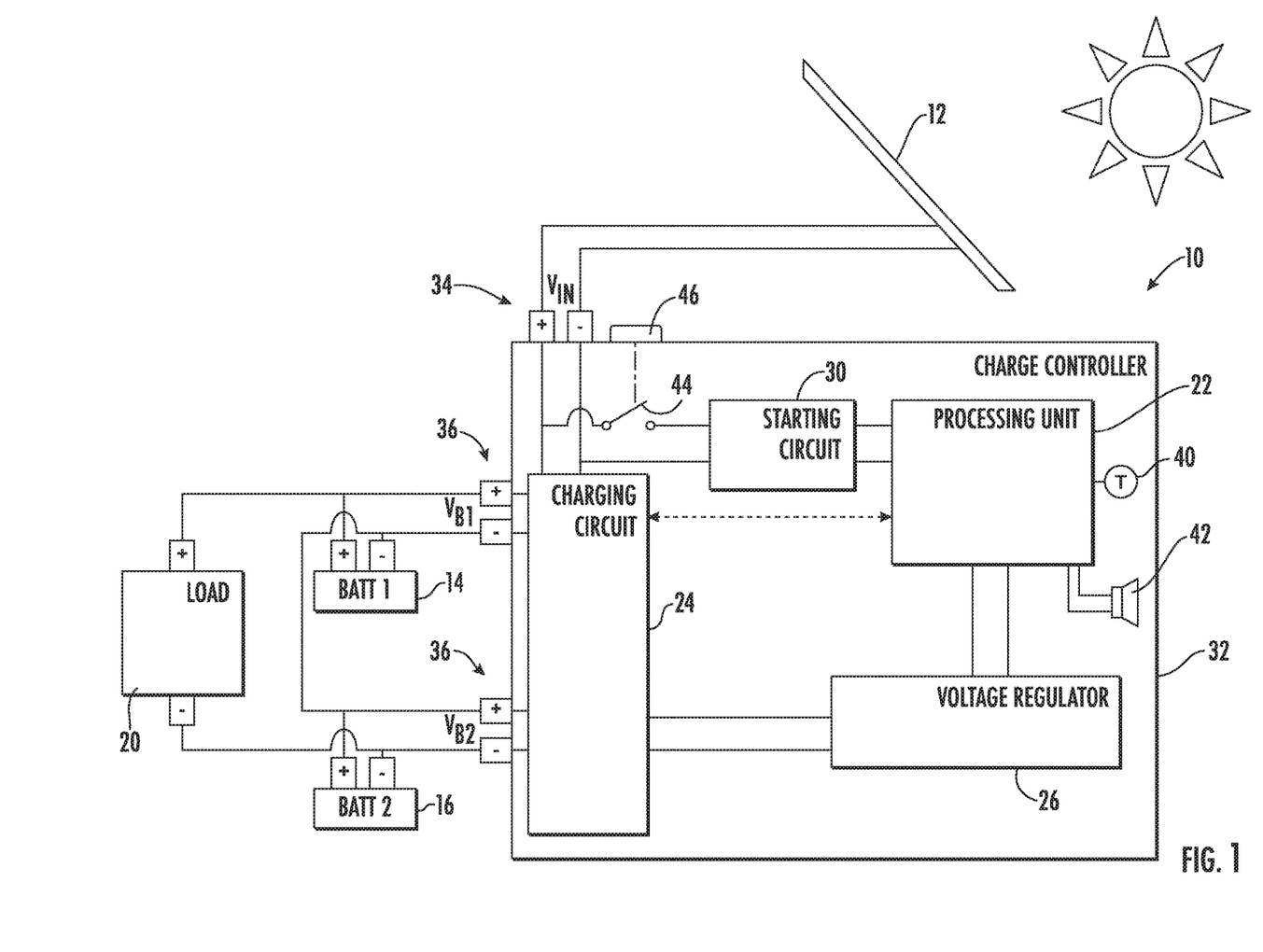
FIG. 1 is a schematic overview of a charge controller and related system, according to an embodiment of the present invention.

According to an embodiment of the present invention, a charge controller 10 connected to a power source 12, such as one or more photovoltaic panels, and a plurality of battery banks 14, 16 used to power a load 20. The charge controller 10 includes a processing unit 22 configured to control the application of electrical power from the power source 12 to the battery banks 14, 16 via a charging circuit 24. Where sufficient voltage is available from the battery banks 14, 16, the processing unit 22 receives electrical power therefrom via the charging circuit 24 and a voltage regulator 26. When sufficient voltage is not available from the battery banks 14, 16, a starting circuit 30 is used to supply electrical power to the processing unit 22 directly from the power source 12.

The charge controller 10 is arranged within its own housing 32 and has disconnectable inputs 34 for the power source 12 and disconnectable outputs 36 for the battery banks 14, 16. Alternately, the charge controller 10 could be hard-wired to the power source 12 and/or battery banks 14, 16. Additionally, components of the charge controller 10 could be distributed in different locations rather than located in a common housing In the depicted embodiment, the power source 12 includes at least one photovoltaic panel. Although particularly beneficial when used in connection with renewable energy sources, such as solar power, it will be appreciated that the charge controller 10 of the present invention could be used in connection with other power sources. Additionally, the charge controller 10 can be configured with inputs for more than one type of power source. Generally, the power source should be selected and dimensioned based on the electrical power requirements of the battery banks to be charged by the charge controller 10.

For economy of illustration, two battery banks 14, 16 are shown. However, the present invention could be employed within more than two battery banks—with the number of charging outputs being selected based upon the number of battery banks associated with the load being powered thereby. As used herein, the term "battery bank" refers to an individually rechargeable unit, and does not necessarily require that a "battery bank" include more than one rechargeable battery cell. For example, the battery bank 14 could include only a single battery cell, or could include multiple battery cells connected in series and/or parallel.

The load 20 is generically depicted; it will be appreciated that the charge controller 10 could advantageously be employed in connection with any electrical system powered by rechargeable battery banks. A particularly beneficial application includes, but are not limited to, battery-powered golf carts.

The processing unit 22 includes one or more microprocessors and machine readable memory storing program instructions for the operation of the microprocessor(s). The processing unit 22 is configured to execute the program instructions to control the charging of the battery banks 14, 16 from the power source 12, as will be explained in greater detail below. Advantageously, the processing unit 22 executes its program instructions based on inputs of the input voltage from the power source 12 ($V_{IN}$) and the voltage of the battery banks 14, 16 ($V_{B1}$, $V_{B2}$) from the charging circuit 24 and outputs charging commands thereto.

The processing unit 22 is further configured to determine when its electrical power is being supplied from the starting circuit 30. An additional control input preferably includes a temperature sensor 40 operable to detect the operating temperature of the processing unit 22. The processing unit 22 is further configured to operate an audible (or other user discernible) indicator 42 under certain conditions, as will be explained below. The processing unit 22 is not limited to any particular number, type or configuration of microprocessors and machine readable memory. In general, the processing unit 22 components should be robust enough to handle unregulated voltage supplied directly from the starting circuit 30 for a limited period of time.

The charging circuit 24 is preferably configured to be able to selectively charge the batteries 14, 16 connected to the outputs 36 thereof, and to vary the charging voltage for the selected battery(ies) to establish bulk, absorption and float cycles. Additionally, the charging circuit 24 is configured to vary the duty cycle of the applied voltage. As noted above, the charging circuit 24 is in signal communication with the processing unit 22 and communicates input voltage and battery bank voltages thereto. The charging circuit 24 varies the charging cycle and the duty cycle based on instructions from the processing unit, as will be explained in greater detail below.

The starting circuit 30 supplies power from the power source 12 directly to the processing unit. In the depicted embodiment, the starting circuit 30 includes a normally open switch 44 operated by a pushbutton 46 or similar operator on the housing 32. The switch 44 returns to the open position when the pushbutton 46 is released. The processing unit 22 utilizes the indicator 42 to alert a user that the pushbutton 46 can be released.

Figure 2:
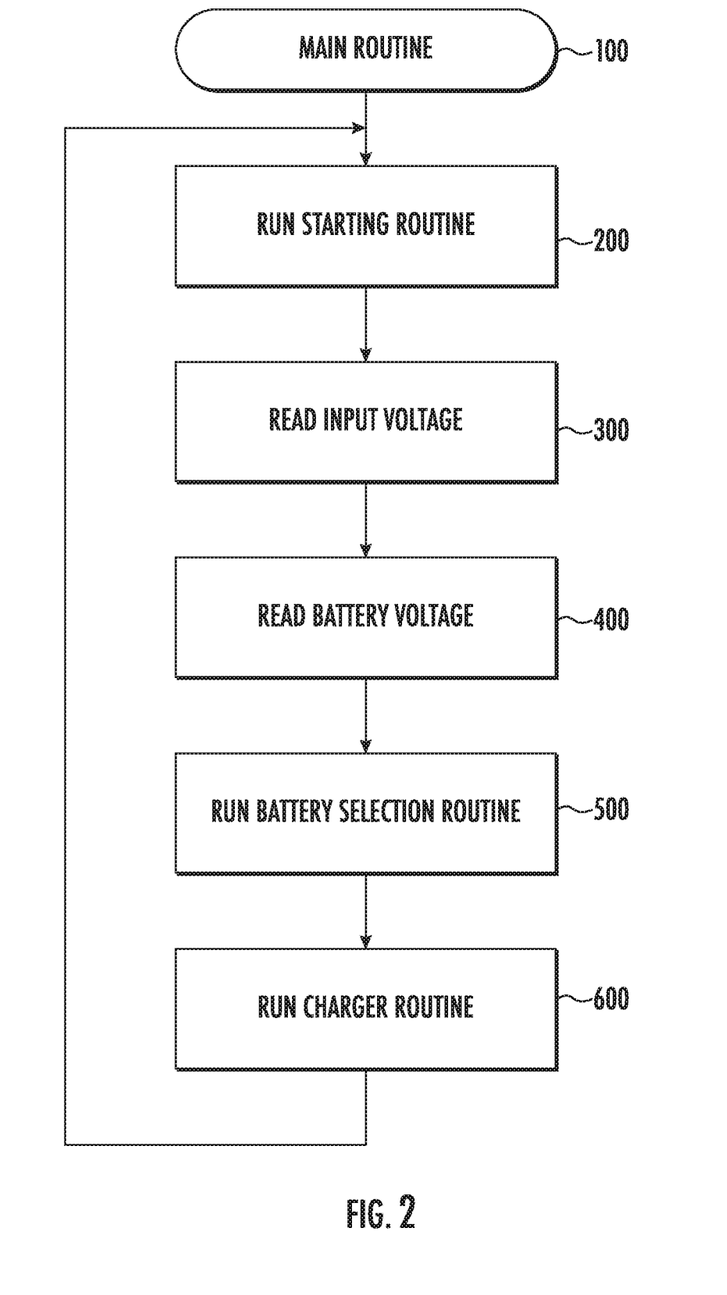
FIG. 2 is a flow diagram of a main routine executed by the charge controller of FIG. 1, the main routine including a starting routine, a battery selection routine and a charger routine.

In operation, referring to FIG. 2, when powered on, the main routine of the charge controller 10 begins (at 100). If the batteries 14, 16 are too depleted to power the processing unit 22, the main routine would ordinarily not be able to start. However, use of the starting circuit 30 allows the main routine to start via the starting routine (at 200). Either after successful completion of the starting routine, or immediately upon initiating the main routine with sufficient battery 14, 16 voltage, the processing unit 22 checks the input voltage ($V_{IN}$) (at 300) and the battery voltages ($V_{B1}$, $V_{B2}$) (at 400) via the charging circuit 24. With that data, the processing unit 22 begins the battery selection routine (at 500). With the battery selection routine completed, the processing unit 22 runs the charger routine (at 600). The main routine continues to repeat as long as the processing unit 22 remains powered.

Figure 3:
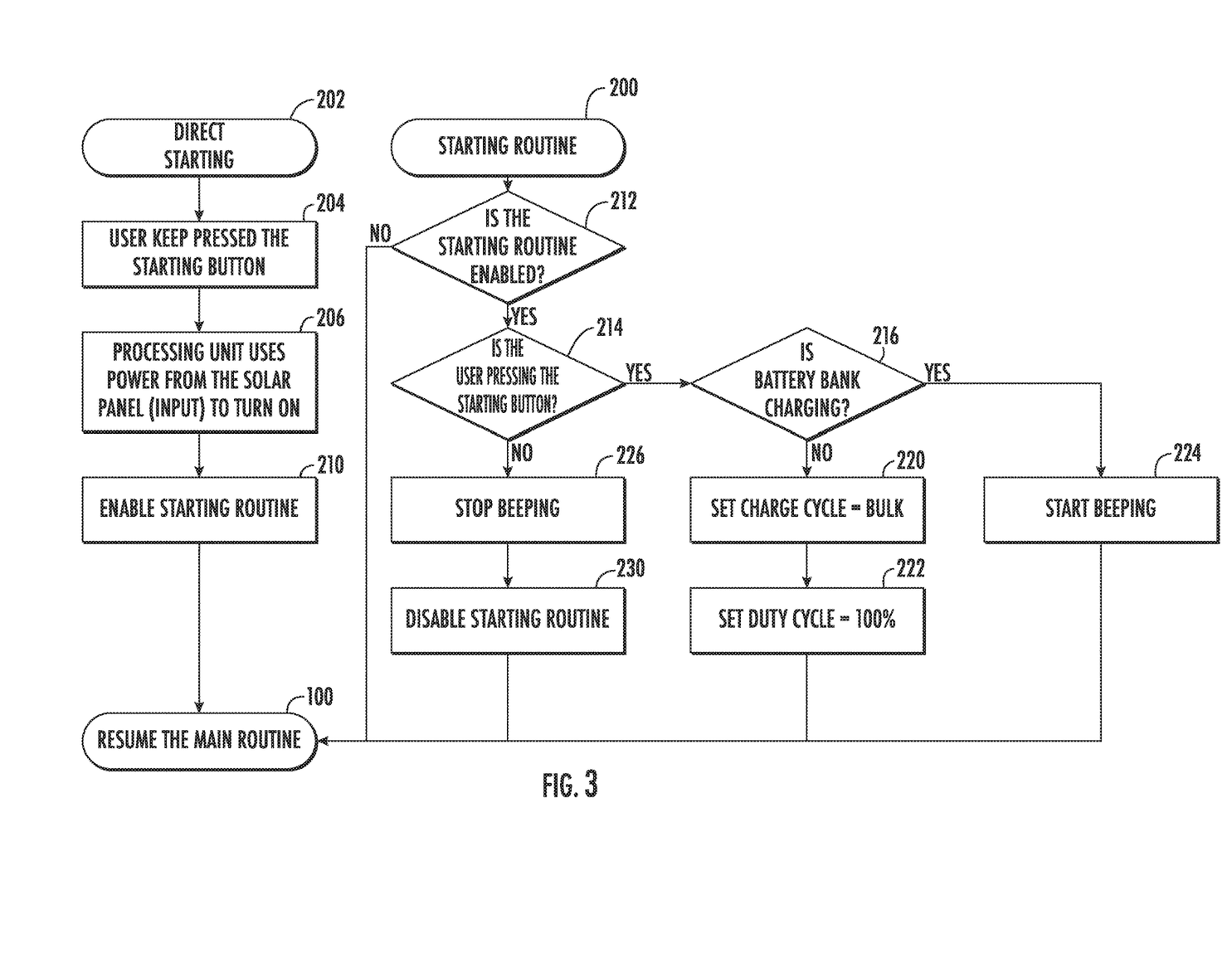
FIG. 3 is a flow diagram of the starting routine of FIG. 2.

Referring to FIG. 3, if insufficient battery power remains to operate the processing unit 22, the user must initiate direct starting (at 202). Ensuring the power source 12 is able to supply electrical power (e.g., by ensuring a photovoltaic panel is placed in sunlight), the user presses and holds the starting button 46 (at 204), which closes the switch 44 and supplies electrical power directly from the power source to power on the processing unit 22 (at 206). The processing unit 22 then enables the starting routine (at 210), which allows the main routine (see FIG. 1) to initiate and proceed to the starting routine (at 200).

The starting routine having been enabled (at 210), at decision 212 of the starting routine, the processing unit 22 proceeds (at 214) to verify that the switch 44 remains closed (i.e., the user continues to press the starting button 46). Battery charging not having commenced at decision 216, the processing unit 22 directs the charging circuit 24 to set the charge cycle to bulk (at 220) and the duty cycle to 100% (at 222). The processing unit 22 then returns to the main routine.

Having once cycled through the main routine, which it will be appreciated would appear nearly instantaneous from the user's perspective, the processing unit 22 returns to the starting routine (at 200). Determining that the starting routine remains enabled (at 212), that the user is still pressing the button 46 (at 214) and that the battery is now charging (at 216), the processing unit 22 operates the audible indicator 42 to beep (at 224)—which signals the user to release the button 46, allowing the switch 44 to reopen. The processing unit 22 then receives electrical power from the charging circuit via the voltage regulator 26.

Following the next cycle through the main routine, the processing unit 22 determining that the starting routine remains enabled (at 212) but that power is no longer being received via the starting circuit 30 (at 214), the processing unit 22 will direct the audible indicator 42 to stop beeping (at 226) and disable the starting routine (at 230). Accordingly, during all subsequent cycles of the main routine, the processing unit 22 will identify the starting routine to be disabled (at 212) and simply continue with the remainder of the main routine.

Figure 4:
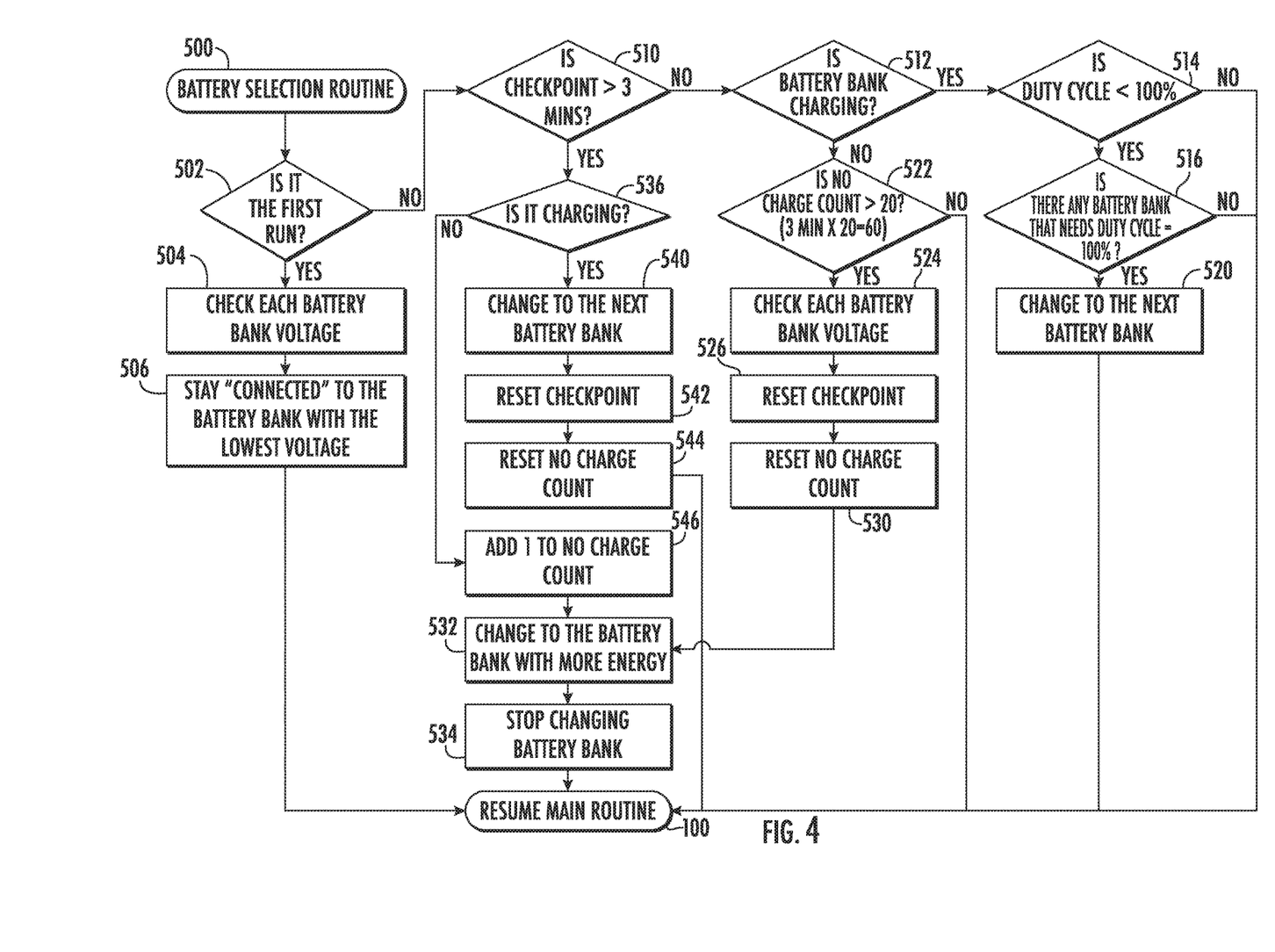
FIG. 4 is a flow diagram of the battery selection routine of FIG. 2.

After checking the input and battery voltages in the main routine (see FIG. 2), the processing unit proceeds to the battery selection routine (at 500). Referring to FIG. 4, if the processing unit 22 determines that it is the initial run of the main routine (at 502), the voltages of the batteries 14, 16 are checked (at 504) Oto confirm that the battery with the lowest voltage is being charged (at 506). On subsequent runs of the main routine, the processing unit 22 determines whether a predetermined checkpoint interval (3 minutes, in the depicted embodiment) has been reached (at 510).

Where the main routine is still within the checkpoint interval, the processing unit 22 next confirms whether the currently selected battery bank 14, 16 is charging (at 512). If the current battery bank is charging, then the processing unit 22 determines whether the duty cycle used to charge the current battery bank is 100% (at 514). Provided the duty cycle is at 100%, the processing unit returns to the main routine, If, however, the duty cycle is not at 100%, the processing unit 22 determines whether any other battery bank requires charging at an 100% duty cycle (at 516). If not, the processing unit 22 returns to the main routine. If there is another battery bank that could utilize an 100% duty cycle while charging, the charging circuit 24 is switched to that battery bank (at 520).

If the processing unit 22 enters the battery selection routine after the first run, and determines that the main routine is still within the checkpoint interval (at 510), but the current battery bank is not charging (at 512), then the processing unit 22 determines (at 522) whether a no charge count (indicative of the duration for which the current battery bank has not been charging) is in excess of a predetermined limit (at 522). If the no charge count remains within the predetermined limit (20, in the depicted embodiment, corresponding to less than one hour without charging), then the processing unit 22 returns to the main routine.

However, if the processing unit 22 determines that the no charge count has exceeded the predetermined limit (at 522), the processing unit again checks the voltage of each battery bank (at 524), resets the checkpoint interval (at 526) and resets the no charge count (at 530). The processing unit 22 then directs the charging circuit 24 to switch to a battery bank having a higher voltage (at 532), which allows the processing unit 22 to serve as a small load on that battery bank. The processing unit 22 has the charging circuit 24 remain on the new battery bank (at 534) and returns to the main routine.

If, after the first run, the processing unit 22 determines that the main routine has exceeded the checkpoint interval (at 510), it is determined whether the current battery bank continues to charge (at 536). If the current battery bank is charging, the processing unit 22 changes to the next battery bank (at 540) and resets both the checkpoint interval (at 542) and the no charge count (at 544). The processing unit 22 then returns to the main routine.

However, if having determined that the main routine exceeded the checkpoint interval (at 510), the processing unit 22 also determines that the current battery bank is not charging (at 536), then one (1) is added to the no charge count (at 546). The processing unit 22 then directs the charging circuit 24 to switch to a battery bank having a higher voltage (at 532), which alternates the non-charging battery bank upon which the processing unit 22 places a small electrical load. The processing unit 22 has the charging circuit 24 remain on the new battery bank (at 534) and returns to the main routine.

Figure 5A:
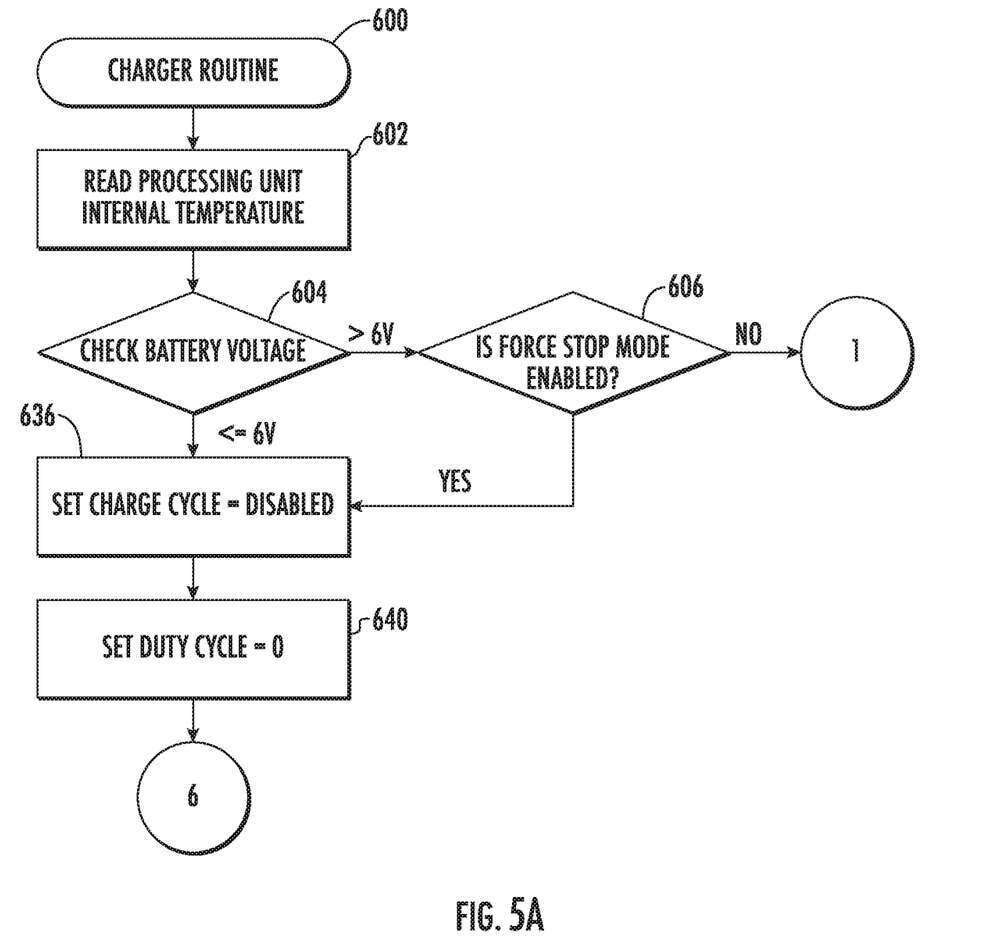
FIGS. 5A-G are a flow diagram of the charger routine of FIG. 2.

Having selected the battery bank to be charged during the charging routine 500 (see FIG. 2), the main routine continues to the charger routine (at 600). Referring to FIG. 5A, the processing unit 22 performs an internal temperature check (at 602) using the temperature sensor 40, which will be used in a temperature protection subroutine to be described below. The processing unit 22 next determines whether there is sufficient battery voltage for continued charge controller operation (at 604). If sufficient battery voltage exists (as would be the case, for instance, after a successful implementation of the starting routine 200, the processing unit 22 then determines whether force stop mode is enabled (at 606). If force stop mode is not enabled, then (see FIG. 5B) the processing unit further determines whether the charge cycle has been set to "disabled."

Figure 5B:
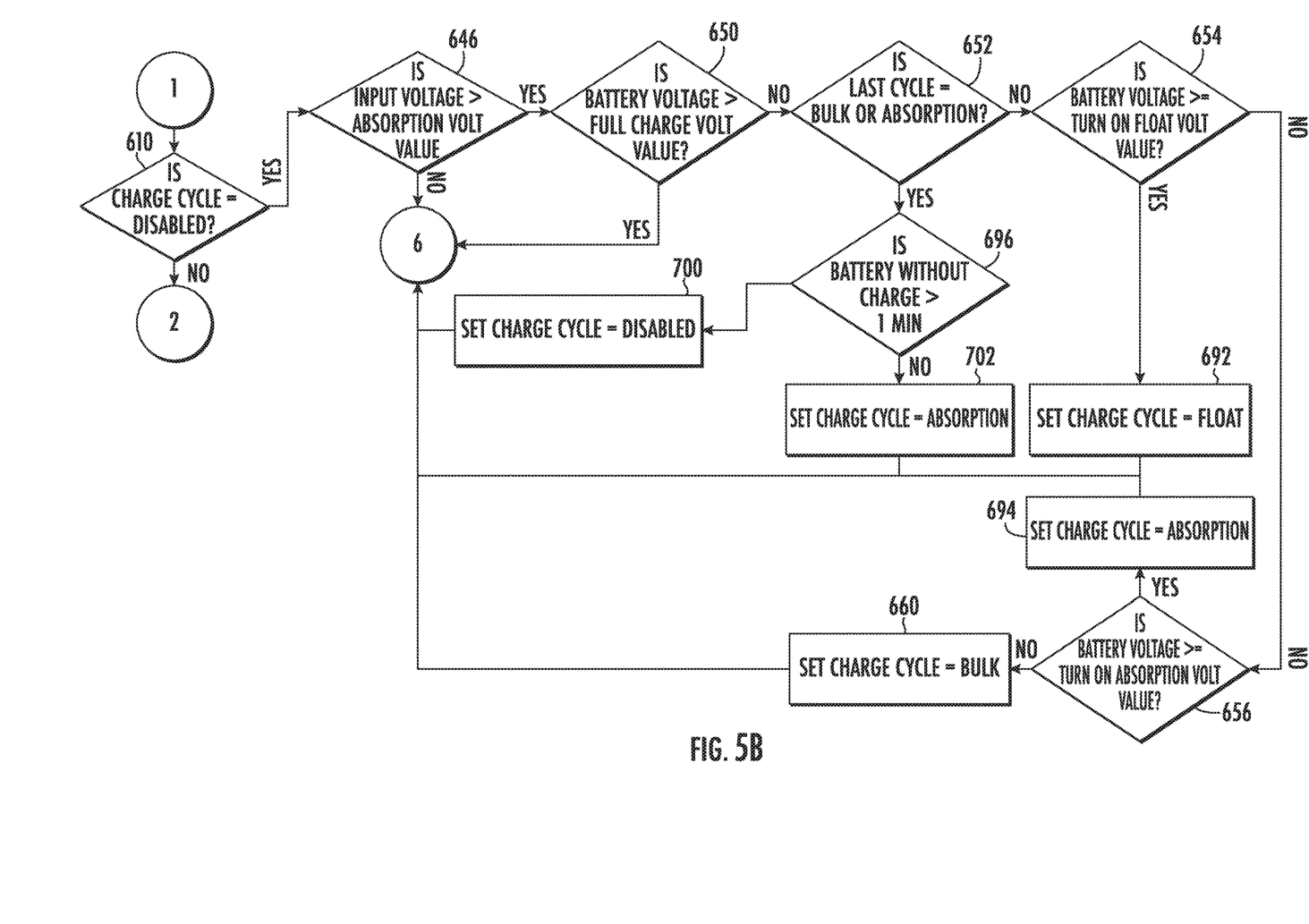
Figure 5C:
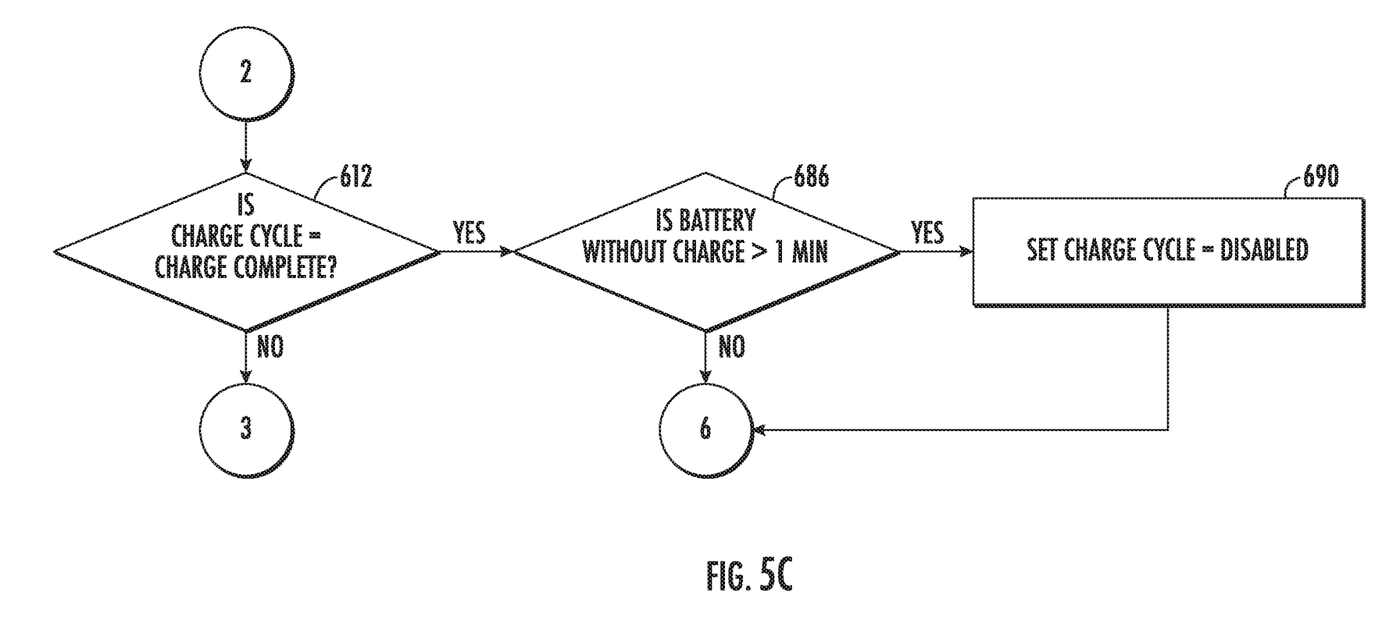
Figure 5D:
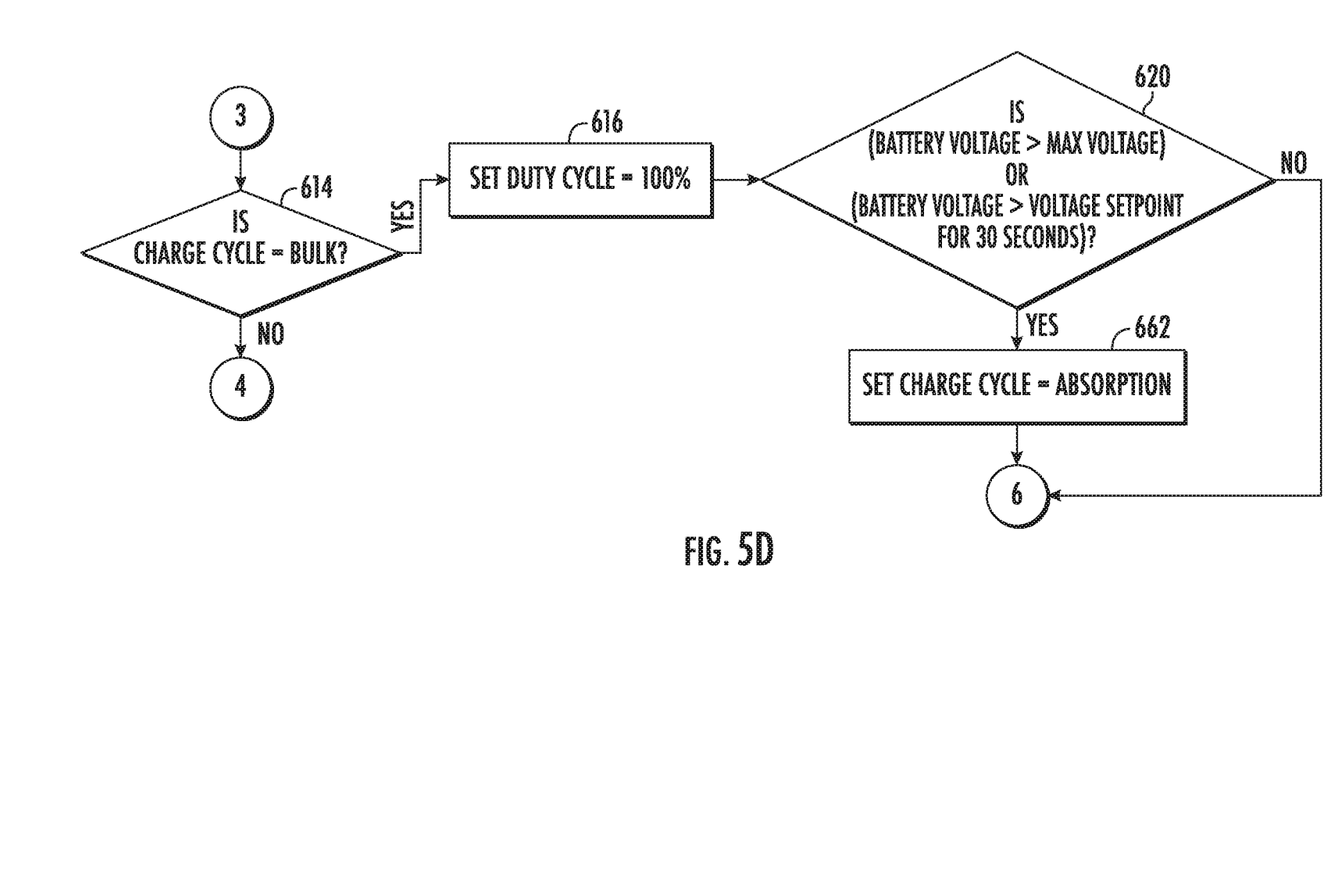

Referring to FIG. 5C, the processing unit 22 determines whether the charge cycle for the current battery bank has been set to "charge completed" (at 612). If not (e.g., when charging a significantly depleted battery immediately after the starting routine 200), it is determined whether the charge cycle is set to "bulk" (at 614, FIG. 5D). As in the previous example of initial charging after a starting routine 200, the charge cycle would be bulk, and the processing unit 22 next directs the charging circuit 24 to set (or maintain) the duty cycle at 100% (at 616). The processing unit 22 then confirms that the battery bank voltage is neither in excess of the maximum battery bank voltage, nor over the bulk charge voltage set point for more than 30 seconds (at 620).

Figure 5E:
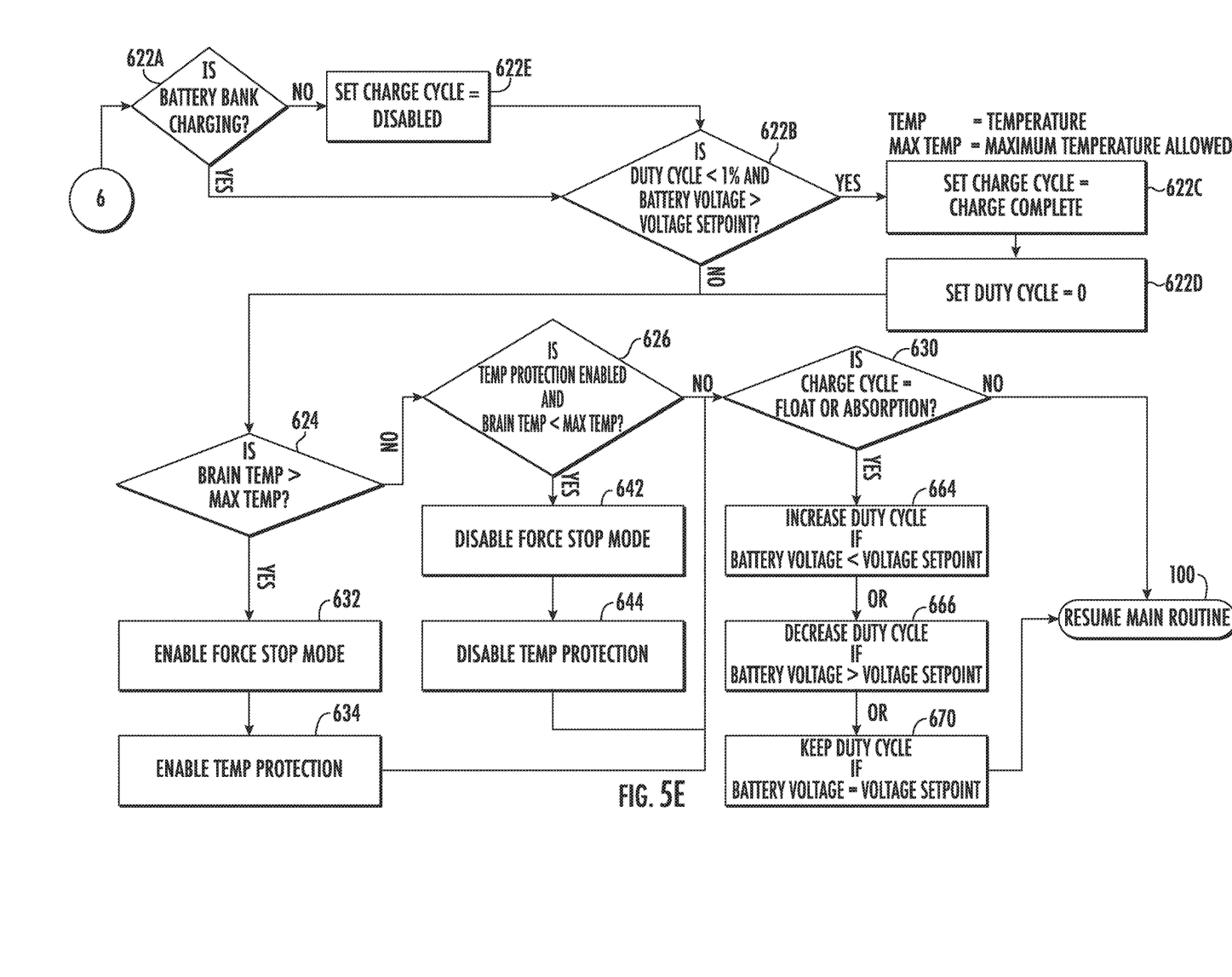

Referring to FIG. 5E, the processing unit 22 confirms (at 622A) the current battery bank is actually being charged (i.e., that current is flowing to the battery bank 14 or 16 from the power source 12 via the charging circuit 24; whereas the query at 536 in FIG. 5 determines whether that charging is to be done on the current battery bank per the most recent iteration of the charger routine). At 622B, the processing unit 22 confirms that the duty cycle is not less than a predetermined threshold (1% in the depicted embodiment) and the current battery bank voltage is not in excess of the voltage set point for the current charge cycle (which following the preceding example, it would not be).

The processing unit 22 then determines whether the internal temperature read earlier (at 602, FIG. 5A) is greater than a predetermined maximum temperature (at 624). If the internal temperature is below the maximum, the charger routine proceeds with the determination of whether temperature protection was previously enabled and the internal temperature has dropped below the maximum (at 626).

With the previous determination having been negative, the processing unit 22 queries whether the charge cycle is "float" or "absorption" (at 630). In the current example, the charge cycle being bulk, the charger routine has the processor return to the main routine 100. Assuming a case where bulk remains the suitable charge cycle through the next iteration of the charger routine, the processing unit returns to the temperature comparison at 624. For purposes of illustration, if the internal temperature now exceeds the maximum temperature, then the processing unit enables force stop mode (at 632) and temperature protection (at 634).

Referring back to FIG. 5A, during the next iteration of the charger routine, the determination of force stop mode (at 606) is positive, and the processing unit 22 accordingly has the charging circuit 24 set the charge cycle to disabled (at 636) and the duty cycle to zero (at 640). This effectively results in the cessation of battery charging until the internal temperature of the processing unit 22 cools below the maximum temperature. Once this happens and the charger routine returns to the determination at 626 (see FIG. 5E), which is now positive, the processing unit disables force stop mode (at 642) and temperature protection (at 644).

With force stop mode disabled, the next iteration of the charger routine will yield a negative result at the determination 606 (see FIG. 5A). Proceeding to 610, the processing unit 22 then determines that the charge cycle is set to disabled. Referring to FIG. 5B, the processing unit 22 will determine whether the input voltage available exceeds the level requires for the absorption cycle (at 646). With sufficient voltage, and assuming a case where bulk remains the suitable charge cycle for the current battery bank, the processing unit 22 will determine that the battery voltage is not greater than the full charge value (at 650), the previous cycle was not bulk or absorption (at 652), that the current battery bank voltage is not greater than the voltage at which the float cycle would normally be enabled (at 654), and also not greater than the voltage at which the absorption cycle would normally be enabled (at 656). The processing unit 22 then directs the charging circuit 24 to set the charging cycle to bulk (at 660).

The charger routine next proceeds through the determination at 622 (FIG. 5E) as previously described. The charger routine will continue through additional iterations as the battery bank continues to charge, subject to continued availability of input voltage from the power source 12 and periodic changing of the battery bank being charged by the battery selection routine 500, until the battery bank voltage is determined (at 620, FIG. 5D) to has either reached the max voltage or exceeded the bulk set point for greater than a predetermined duration (30 seconds in the depicted embodiment). The processing unit 22 then directs the charging circuit 24 to set the charge cycle to absorption (at 662).

Referring to FIG. 5E, with the charge cycle now set to absorption, the charger routine eventually returns to determination 630 and returns a positive indication. The processing unit 22 compares the current battery bank voltage with the voltage set point for the current charge cycle (in this case, absorption). The duty cycle is increased if the current voltage is below the set point (at 664), decreased if the current voltage is above the set point (at 666) and maintained the same if the current voltage is at the set point (at 670). The processing unit 22 then returns to the main routine 100.

Figure 5F:
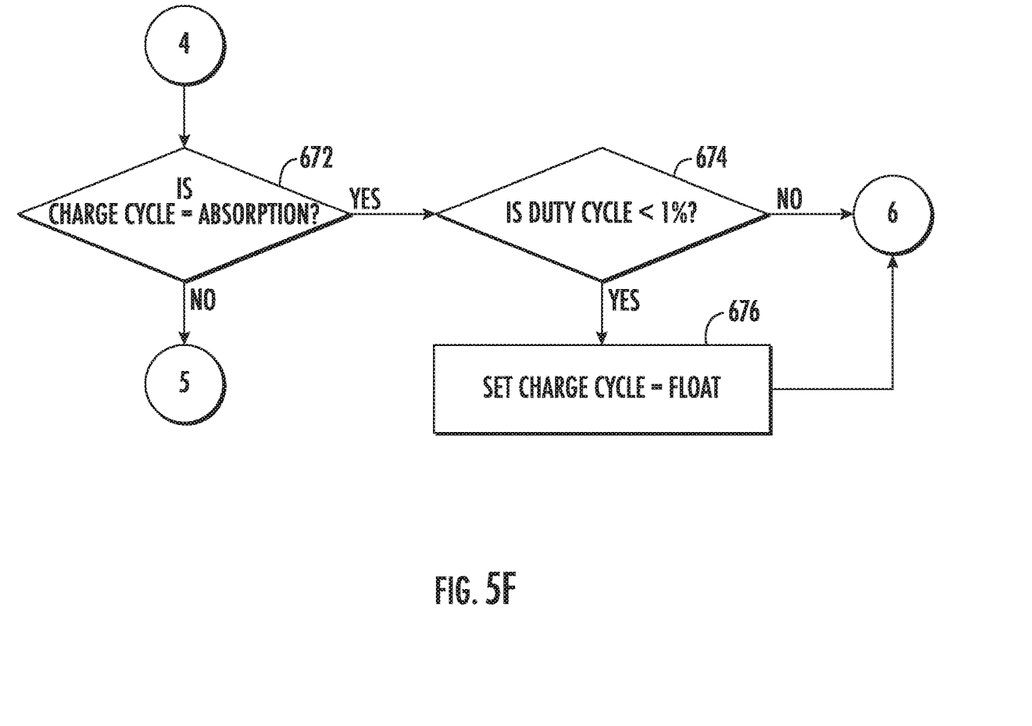

When the charger routine proceeds to determination 614 with the charge cycle set to absorption (FIG. 5D), a negative indication is received. Referring to FIG. 5F, the charger routine proceeds to determine that the charge cycle is currently set to absorption (at 672) and then determines (at 674) if the duty cycle is less than a predetermined level (1% in the depicted embodiment). As the battery bank continues to be charged, the duty cycle will be reduced (at 666). Once the duty cycle drops below 1%, a positive indication is received at 674 and the processing unit 22 directs the charging circuit 24 to set the charge cycle to float (at 676). The duty cycle of the float charging cycle is adjusted as previously described in subsequent iterations of the charger routine (as at 664-670; FIG. 5E).

Figure 5G:
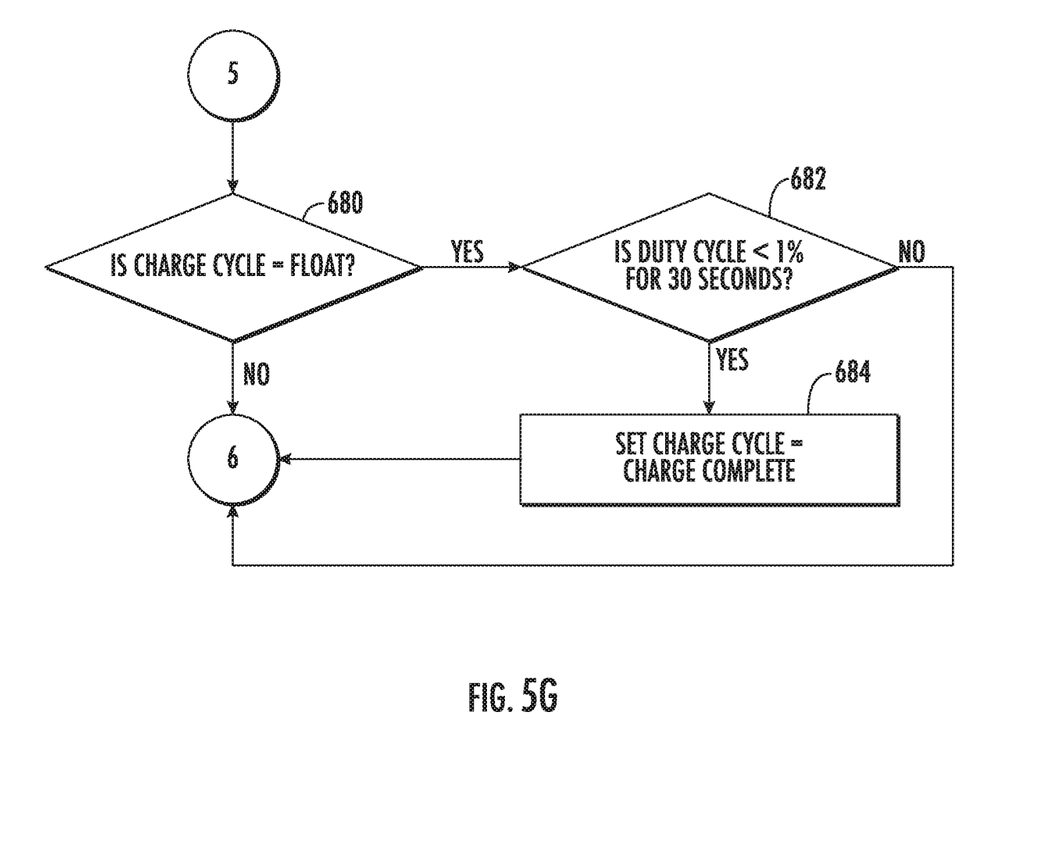

Referring to FIG. 5G, with the battery bank again continuing to charge in the float cycle, a positive indication will be received at determination 680. The duty cycle will eventually get reduced below the predetermined level, such that a positive indication is received at determination 682. The processing unit 22 then directs the charging circuit 24 to set the charging cycle to "charge complete" (at 684). Also, if processing unit 22 determines (at 622B), during any other iteration of the charger routine 600, that the duty cycle is below the determined level and the battery voltage is greater than the voltage setpoint, the charge cycle will be set to complete (at 622C) and the duty cycle set to zero (at 622D).

Referring to FIG. 5C, with the charging cycle set to charge complete, when the charger routine next reaches determination 612, a positive indication will be returned. The processing unit 22 then determines (at 686) whether the current battery bank has not been charging for greater than a predetermined interval (one minute, in the depicted embodiment). The processing unit 22 continues iterations of the charger routine until a positive indication is received at 686. When the current battery bank has been without charge for greater than the predetermined interval, then the charging circuit 24 is directed to set the charge cycle to disabled for the current battery bank (at 690).

With the charge cycle disabled, the subsequent iteration of the charger routine for the current battery bank will yield a positive indication at determination 610 (see FIG. 5B). In the present scenario, the charge cycle of the current battery bank was set to charge disabled from charge complete after completing charging in a float charge cycle. As the current battery bank discharges with the charge cycle disabled, provided the input voltage remains above the level required for absorption charging (as determined at 646), the voltage will eventually drop below the full charge value (as determined at 650).

Provided the battery voltage remains above the float cycle voltage level (as determined at 654), the processing unit 22 will direct the charging circuit to set the charge cycle to float (at 692), and the charger routine will continue in float as described previously. If, for instance with a heavier load, the voltage level drops below the float value, then the processing unit 22 determines whether the current battery bank voltage remains above the absorption level (at 656). If it does, the processing unit 22 directs the charging circuit 24 to set the charge cycle to absorption (at 694). Otherwise, the charge cycle is set to bulk (at 660). In either case, the charger routine then continues as described previously in connection with those charge cycles.

In some instances, the last charging cycle before the current battery bank was set to charge disabled will have been bulk or absorption instead of float. This could happen, for example, due to a drop in power from the source 12 (such as sunset) that resulted in a negative determination by the processing unit 22 at 622A, which would then set the charge cycle to disabled (at 622E)—although the previous charge cycle was still bulk or absorption. In such instances, the determination at 652 will be positive. The processing unit 22 then determines whether the current battery bank has not been charging for greater than the predetermined duration (at 696). If it has not been charging for more than the predetermined duration, the processing unit 22 has the charging circuit 24 maintain the charge cycle as disabled (at 700). Otherwise, the charge cycle is set to absorption, and the charger routine continues.

As described in connection with the battery selection routine 500 (see FIG. 4), the processing unit 22 will regularly direct the charging circuit 24 to switch the current battery bank. The scenarios described above in connection with the charger routine 600 reference a given one of the battery banks 14, 16 served by the charging circuit 24. Hence, the processing unit 22 stores not only charge cycle parameters relating to whichever battery bank is current being charged, but also those relating to the battery bank(s) not being charged. Accordingly, when the current battery bank is changed, the corresponding related parameters are recalled and used as necessary to make the logical determinations of the charger routine.

It will be appreciated from the foregoing that a charge controller according to the present invention advantageously enhances the utilization of electrical power available from a power source (and particularly from a renewable energy source like photovoltaic panels) for battery charging. By switching between battery banks at a regular and relatively frequent interval, the charge controller helps ensure that a large disparity does not develop between battery bank voltages during charging. By also monitoring required duty cycles during charging, the charge controller is enabled to switch battery banks earlier than the normal interval to ensure that as much of the available electrical power from the power source is being utilized.

Additionally, by incorporating a starting circuit allowing power to be applied to the processing unit directly from the power source, the present charge controller can be used even in situations where the batteries to be charged are completely depleted. This is particularly advantageous in golf cart and other vehicular scenarios, where the battery banks may have become depleted at a significant physical distances from other power sources.

The foregoing is provided for illustrative and exemplary purposes; the present invention is not necessarily limited thereto. Rather, those skilled in the art will appreciate that various modifications, as well as adaptations to particular circumstances, are possible within the scope of the invention as herein shown and described and of the claims appended hereto.

What is claimed is:

1. A charge controller comprising:
    a plurality of charging connections for connecting a respective plurality of battery banks;
    at least one voltage input connection for connecting a power source;
    a charging circuit electrically connected between the plurality of charging connections and the at least one voltage input connection and operable to independently charge the respective plurality of battery banks at the plurality of charging connections with electrical power from the at least one voltage input connection, and to sense an input voltage at the input voltage connection and respective battery bank voltages at each of the plurality of charging connections;
    a voltage regulator electrically connected to the charging circuit and operable to output regulated electrical power;
    a processing unit electrically connected to the voltage regulator to receive the regulated electrical power and in signal communication with the charging circuit, the processing unit including at least one microprocessor and machine readable memory configured to control the charging circuit based on the input voltage and respective battery bank voltages sensed thereby; and
    a starting circuit connected between the at least one voltage input connection and the processing unit, the starting circuit including a normally open switch, the normally open switch being operable by a user to supply the electrical power from the at least one voltage input connection to the processing unit so as to bypass the charging circuit and the voltage regulator;
    wherein the starting circuit allows the processing unit to be powered on when the respective battery bank voltages are insufficient to energize the starting circuit via the charging circuit and voltage regulator.

2. The charge controller of claim 1, wherein the processing unit is configured with program instructions to execute a starting routine to direct the charging circuit to commence charging at least one of the respective battery banks upon being powered up via the starting circuit.

3. The charge controller of claim 2, wherein the starting routine further includes directing the charging circuit to commence charging the at least one of the respective battery banks in a bulk charging cycle with a 100% duty cycle.

4. The charge controller of claim 2, further comprising an indicator in signal communication with the processing unit;
    wherein the starting routine further includes operating the indicator once the charging circuit has commenced charging the at least one of the respective battery banks.

5. The charge controller of claim 4, wherein the indicator is an audible indicator.

6. The charge controller of claim 4, wherein the starting routine further includes ceasing operation of the indicator once the normally open switch re-opens.

7. The charge controller of claim 6, wherein the starting routine further includes disabling the starting routine after the normally open switch re-opens.

8. The charge controller of claim 2, wherein the processing unit is further configured with program instructions to execute a selection routine to direct the charging circuit to automatically change which of the respective plurality of battery banks are being charged after a predetermined checkpoint interval.

9. The charge controller of claim 8, wherein the selection routine further includes directing the charging circuit to automatically change which of the respective plurality of battery banks are being charged within the predetermined checkpoint interval if the one of the respective plurality of battery banks is currently being is determined to require a duty cycle of less than 100% and another one of the respective plurality of battery banks is determined to require a higher duty cycle.

10. The charge controller of claim 1, wherein the starting circuit includes a pushbutton operator.

11. The charge controller of claim 10, wherein the pushbutton operator and the normally open switch are biased open, such that the normally open switch automatically opens upon release of the pushbutton operator.

12. The charge controller of claim 10, further comprising a housing, the plurality of charging connections, the at least one input connection, the charging circuit, the voltage regulator, the processing unit and the starting circuit being arranged in the housing.

13. The charge controller of claim 1, further comprising at least one photovoltaic panel electrically connected to the at least one voltage input connection.

14. A charge controller comprising:
    a plurality of charging connections for connecting a respective plurality of battery banks;
    at least one voltage input connection for connecting a power source;
    a charging circuit electrically connected between the plurality of charging connections and the at least one voltage input connection and operable to independently charge the respective plurality of battery banks at the plurality of charging connections with electrical power from the at least one voltage input connection, and to sense an input voltage at the input voltage connection and respective battery bank voltages at each of the plurality of charging connections;
    a voltage regulator electrically connected to the charging circuit and operable to output regulated electrical power;
    a processing unit electrically connected to the voltage regulator to receive the regulated electrical power and in signal communication with the charging circuit, the processing unit including at least one microprocessor and machine readable memory configured to control the charging circuit based on the input voltage and respective battery bank voltages sensed thereby; and
    wherein the processing unit is further configured with program instructions to execute a selection routine to direct the charging circuit to automatically change which of the respective plurality of battery banks are being charged after a predetermined checkpoint interval;

wherein the selection routine further includes directing the charging circuit to automatically change which of the respective plurality of battery banks are being charged within the predetermined checkpoint interval if the one of the respective plurality of battery banks is currently being is determined to require a duty cycle of less than 100% and another one of the respective plurality of battery banks is determined to require a higher duty cycle; and wherein the selection routine further includes incrementing a no charge count at the predetermined interval if the one of the respective plurality of battery banks is currently being is determined not to be charging.

15. The charge controller of claim 14, wherein the predetermined checkpoint interval is less than or equal to ten minutes.

16. The charge controller of claim 15, wherein the predetermined checkpoint interval is less than or equal to five minutes.

17. The charge controller of claim 16, wherein the predetermined checkpoint interval is three minutes.

18. The charge controller of claim 14, wherein the selection routine further includes changing the charging circuit to another one of the respective plurality of battery banks identified as having a higher voltage after incrementing the no charge count.

19. The charge controller of claim 18, wherein the selection routine further includes changing the charging circuit to another one of the respective plurality of battery banks identified as having a higher voltage within the predetermined interval if the no charge count exceeds a predetermined level.

20. The charge controller of claim 19, wherein the predetermined level corresponds to one hour without charging.

\* \* \* \* \*